Patented Mar. 28, 1939

2,151,975

UNITED STATES PATENT OFFICE 2,151,975

VARNISH

Harry Kline, Plainfield, N. J., assignor to Bakelite Corporation, New York, N. Y., a corporation of Delaware No Drawing. Application December 7, 1935, Serial No. 53,424

15 Claims. (Cl. 260—53)

In the general field of synthetic resin varnishes, this invention relates to laminating and electrically insulating varnishes which have a relatively long shelf life and which do not appreciably change in viscosity upon standing, yet set quickly under heat and pressure and have excellent electrical properties.

Varnishes for impregnating are usually prepared by dissolving a phenolic resinoid in a suitable solvent, for example alcohol, and this solution is then used to impregnate either paper or cloth. Special machines are used to accomplish this impregnation, the essential features of which are a dip tank in which the varnish is contained and through which the fabric passes, and a drier into which the varnish impregnated sheet passes from the dip tank and where the solvent is evaporated. The dried sheet is then cut into convenient sized strips which, when superimposed, may be consolidated under heat and pressure to a hard, dense, rigid plate.

In order to operate the impregnating machines efficiently and continuously, it is necessary that the varnish used for impregnation be of uniform quality and, more especially, remain uniform in consistency or viscosity. Thus a machine adjusted to operate with a varnish of a certain viscosity will not operate satisfactorily on varnishes of higher or lower viscosity. Consequently any material change in the viscosity of the impregnating solutions means that either the viscosity of the varnish must be adjusted to the machine, or alterations must be made in the machine to provide for the change in viscosity. But in the case of laminating varnishes prepared from the usual type of phenolic resinoids, changes of this kind have been found to be most troublesome. This is due to the fact that such varnishes increase in viscosity on aging, and as a consequence, adjustments must be made periodically in order to insure satisfactory production. Simple dilution of such varnishes with more solvent to decrease the viscosity is not practical, since the change in the viscosity of phenolic resinoid varnishes usually results from the advancement or increased polymerization of the resinoid. This advancement in turn makes the resinoid more sensitive to temperature change; that is, the resinoid being already partially advanced requires a lessened amount of heating to convert it to the infusible state, and this conversion is liable to occur during the drying of the impregnated sheet. It is obvious, of course, that paper or fabric impregnated with an infusible resinoid is unsuitable for laminating, since such sheets could not be consolidated under heat and pressure. This means, therefore, that in working with varnishes which have polymerized due to aging or storage, it is necessary to operate the machines either at faster speeds, or at lower temperatures, and particularly in a much narrower range of temperature, thus greatly increasing the hazards of processing. For these reasons the impregnated paper produced in practice is far from uniform in properties, portions of it containing resinoid too far advanced to be suitable for laminating.

To obtain somewhere near satisfactory results when operating with phenolic resinoid varnishes, recourse is often made to the expedient of so operating the machine as to retain an increased portion of volatiles in the impregnated sheet. This is usually accomplished either by lowering the temperature and keeping the time of passage through the drier the same, or by passing the impregnated paper through the machine more rapidly and maintaining the normal drying temperature. The increase in volatiles gives flow to the resinoid binder so as to enable the sheets to be consolidated under heat and pressure. Laminated material prepared in this way, however, is deficient in strength, has a tendency to delaminate and possesses a surface which is often blistered and dull due to the excess volatiles evolved during the pressing operation. It may also be poor in electrical properties, such as surface resistance.

High viscosity varnishes which have been diluted to lower their viscosity do not penetrate well and as a consequence, the binder merely dries on the surface of the sheets without substantially penetrating into the fibre. The laminated material produced from sheets of this kind is low in water resistance, since the waterproofing resinoid binder merely hardens between the sheets and the unimpregnated fibrous sheets then act as so many wicks through which water may be absorbed. Varnishes of this kind also spread unevenly, resulting in non-uniformly coated paper. The lowered penetration of such varnishes and the unevenness in spreading is probably due to the fact that as the varnish increases in viscosity due to aging, it becomes more and more difficult to disperse in solvents, and the dispersions which are obtained are no longer homogeneous solutions but rather dispersions of soluble as well as insoluble or difficultly soluble resinoid material. The particle size of the dispersed phase in dispersions of this character is such that it does not penetrate well and is distributed unevenly over the fibre. This increase in the viscosity of phenolic resinoid varnishes can even continue to the point where it is no longer possible to dilute them. Such varnishes are obviously useless and constitute a loss which is reflected in an increase in the cost of the manufacture of laminated material.

In addition to all these difficulties which arise when working with reactive resinoid varnishes of this character, there is always the difficulty of storing such a material; consequently it becomes impossible for the laminator to anticipate his needs and build up a sufficient varnish reserve to meet the fluctuating demands of the trade.

I have made certain discoveries relating to the manufacture of phenolic resinoid varnishes, the resins used therein and methods of preparation which give improved results.

The phenolic materials which I prefer to use are the cresols, xylenols and higher molecular weight phenolic tar acid bodies and the higher molecular weight homologs thereof. Phenol may be used but, whereas phenol has usually been considered preferable in the preparation of varnishes and produces a relatively fast setting varnish, I have found that the less expensive cresols and xylenols and higher homologs, when used with the hereinafter described catalysts produce varnishes which are, so far as I am aware, as fast setting as a phenol varnish and much faster in setting under heat and pressure than the varnishes ordinarily produced from cresols or xylenols using basic nitrogen catalysts other than those hereinafter described. It is found that there is a rather sharp line of distinction between phenol and the phenolic bodies of higher molecular weight so far as this invention is concerned.

The aldehyde or methylene body which is used is preferably formaldehyde or its polymer, paraform, and the catalysts used are preferably the secondary and tertiary simple alkyl substituted amines. There appears to be a peculiar relation between the formaldehyde body and the catalyst which produces the improved varnishes.

The amines which I use should be such that they produce a basic catalytic action throughout the condensation and hardening reaction, preferably more basic than ammonia under the conditions of the reaction but they should not combine with the formaldehyde except possibly by bonds which are easily broken, for instance by simple heating. Ammonia and primary methyl amine are not such catalysts; they combine with formaldehyde with relatively strong bonds to form hexamethylenetetramine or methyl methylene amine which remain in the varnish and cause it to have a short shelf life, that is the hexamethylenetetramine or methyl methylene amine cause a rapid increase in viscosity of the varnish with the attendant disadvantages. The mono-substituted hydrazines likewise combine with formaldehyde. The amines should thus have at least a weaker bond with formaldehyde than has ammonia and methyl amine or the usual primary amines.

The amines which I use should contain one or more alkyl groups but preferably do not contain other groups. Amine compounds containing combined cyclic groups and hydroxyl groups used as catalysts, adversely affect the production of superior resins and give varnishes with short shelf life or slow hardening properties or high water absorption. The characteristics of the purely alkyl amines and those containing cyclic and hydroxyl groups are quite different, as are the resins and varnishes produced by using the different catalysts. It has been found that the simple di and tri alkyl amines catalyze the initial resin forming reaction of cresol or higher homologs, which normally takes place in commercial production at elevated temperatures of about 100° C. at atmospheric pressure (different temperatures being possible with suitable adjustments of reaction time), to produce resins which are highly reactive in the hardening reaction, which takes place at elevated temperatures, even with complete or substantially complete removal of the catalyst yet the varnishes are surprisingly stable in storage and resistant to aging so far as their viscosity change at normal room temperatures of 20 to 25° C. is concerned; varnishes made from resins catalyzed by the simple alkyl amines may be kept from 3 to 6 months at room temperatures with little or no appreciable change in viscosity yet they harden very quickly at the elevated temperatures ordinarily used in commercial practice, for example from 130 to 170° C. and this quick hardening takes place even though all or substantially all of the catalyst is removed. With resins made in the presence of catalytic amines containing the cyclic or hydroxyl groups, the catalyst must be left in the resin (or varnish) to obtain a quick hardening but the varnish then rapidly increases in viscosity when stored or has a high water absorption; if the catalyst is removed to obtain a longer shelf life, the resin does not harden quickly and more catalyst must be added to obtain the hardening speeds comparable with the simple alkyl amine catalyzed varnish resins. Cyclic groups and hydroxyl groups etc. combined in the amine appear to so change its character that it more slowly catalyzes the resinification and hardening reactions and much larger amounts are required to obtain the same state of resinification; further the resins and the varnishes produced therefrom are either much slower in hardening at elevated temperatures, or have much greater water absorption or increase in viscosity much more rapidly at storage temperatures than when the poly-substituted alkyl amines are used as catalysts.

By using the simple di or tri alkyl substituted amines as catalysts in the initial resin forming reaction with cresol or higher homologs, preferably reacting under reflux and dehydrating with vacuum, it is possible to make varnishes having a long shelf life yet produce laminated material which hardens quickly and has excellent electrical properties.

The amines which I use should also be easily removable as such during the production of the varnish or varnish resin, for instance by simple heating of the reaction products. The majority of the catalyst should be removable from the varnish or resin, under the conditions of resin manufacture, at temperatures not exceeding aproximately 120° C. at atmospheric pressure or under vacuum. Much of the varnish made according to this invention is used in producing laminated panels etc. for electrical devices. If a catalyst such as sodium hydroxide or other base, either organic or inorganic, were used in the resin formation, its catalytic effect might be decreased after the resinification reaction, by neutralization, but this would leave conducting salts in the varnish and slow up the setting time and the laminated material would be poor for insulating panels. If it be attempted to remove the salts by washing the resin, water soluble intermediate reaction products are also removed so that the yields of varnish are reduced and the fusibility and flow of the resin is so lowered that its penetrating and binding power when applied to a fabric is greatly decreased. Also the washing is cumbersome and expensive in itself, to say nothing of the intermediate and water soluble products lost thereby and the poorer quality of varnish produced.

With regard to varnishes and their use in the preparation of electrically insulating panels, and particularly with relation to alcohol amines as catalysts, I have discovered that panels prepared with my varnishes have better insulating characteristics than those prepared with varnishes catalyzed with the alcohol amines and are much more resistant to water; and also that the alcohol amines do not produce resins which harden so rapidly at high temperature as do the resins catalyzed by the simple amines. Tests were made with laminated samples 1 x 3 inches by approximately .08 inch thick prepared under similar conditions with the interior laminae containing 47 to 51% resin and surface sheets containing 57 to 60% resin, immersed in water at room temperature for 24 hours. Where the resin binder was a varnish made with trimethyl amine catalyst there was a 0.79% increase in weight, with dimethyl amine a 0.68% increase, with diethyl amine a 0.77% increase, and with triethanol amine a 1.40% increase. Power factor determinations at $10^3$ and $10^6$ cycles per second and also tests for resistivity were made on samples of laminated prepared as described above. The results were as follows:

| Catalyst used | Resistivity megohms —cms. | Power factor $10^3$ cycles | Power factor $10^6$ cycles |
|---|---|---|---|
| Trimethyl amine | $1.19 \times 10^7$ | .0385 | .0435 |
| Dimethyl | $1.69 \times 10^7$ | .0275 | .0410 |
| Diethyl | $1.28 \times 10^7$ | .0380 | .0435 |
| Triethanol | $1.58 \times 10^6$ | .0715 | .0505 |

Thus by using the simple alkyl amines as catalysts, I am enabled to use less catalyst and also catalysts which absorb less water than the alcohol amines, and I obtain better insulating panels at a lower cost than where the alcohol amines were used.

According to my process of producing a varnish, the cresol, xylenol, or other suitable phenolic body is reacted with formaldehyde in the presence of a small amount of simple aliphatic amine catalyst, for instance di or tri methyl, ethyl or propyl amine, or higher homologous alkyl amine, until the resin is substantially formed, preferably until at least 90% of the formaldehyde theoretically capable of combining, has reacted. The resin is dehydrated, preferably until at least 95% of the water is removed. The reaction preferably takes place under a reflux to prevent escape of raw materials and particularly of the catalyst. It must here be borne in mind that a varnish is considerably different from a molding powder and the catalytic effects of a catalyst may vary depending upon whether the resinification or hardening action is being catalyzed, in that in a varnish the ingredients are in a solution and react rather easily whereas a molding powder is dry and the ingredients do not react to any substantial degree during storage and in the case of varnishes the effect of the same catalyst may also be different for resinification, for storage and for hardening. For varnishes, according to my invention, the end point of the reaction (including resinification and dehydration) is considered complete and the stability of the varnish is considered satisfactory when the varnish (60% resin and 40% alcohol) does not change its viscosity more than an average of 5 to 7% in thirty days at 25° C. The end point of the resinification reaction having been determined by control tests for the first few commercial batches, succeeding commercial batches may be made under like conditions.

After the end point of the resinification reaction has been reached, the reaction product is dehydrated to the desired extent and a substantial portion of the catalyst may be simultaneously removed. The time and temperature of the dehydration and removal of catalyst should be allowed for in determining the end point of the resinification. This step preferably takes place under a vacuum. For the herein described varnishes having the desired low viscosity change, the nitrogen due to the catalyst remaining in the varnish should not exceed 0.2% of the weight of the resin and preferably should be less. The general preferred range is between .03 to 0.12% of the weight of the resin for the various catalysts and phenolic materials herein described.

Thus using the secondary and tertiary alkyl amines in the production of the varnish, I react the cresol, xylenol, etc. with the formaldehyde in the presence of one or a mixture of these amines, until the correct end point is reached. The reaction product is then dehydrated to the desired extent and preferably the desired quantity of catalyst is simultaneously removed so that its amount does not exceed that previously stated. The resinous reaction product together with the remaining catalyst is then dissolved in the solvent to form the varnish and in this connection the correlation of the factors involved in this invention should be pointed out. Having discovered the peculiar characteristics of these catalysts and having discovered that the straight aliphatic amine catalyst may largely be removed and yet leave a varnish having long shelf life but quick hardening speed, I may react the resin to such a point that the varnish has the desired viscosity for the use to which the varnish is to be put. Such a viscosity is normally between 200 and 500 k. v. at 25° C. for an ethyl alcohol solution containing 60% of the resin. Such a varnish will show only a small percentage change in viscosity over a period of from 3 to 6 months yet when heated to 160° C. will set to an infusible resin in from 30 to 50% less time than an ammonia catalyzed varnish of similar viscosity and resin content which will show a high percentage of viscosity change over a period of 3 to 6 months. The comparative rates of hardening at elevated temperatures may be shown by another test; this is the gel time of the varnish where it is found that 10 c. c. of the amine catalyzed varnish of the normal viscosity range will gel in 400–500 seconds at 130° C. as compared to 800–1200 seconds for a similar ammonia catalyzed varnish.

The following are examples of the preparation of typical varnishes:

*Example I.*—100 parts of commercial cresol, 80 parts Formalin (37% solution), 2 parts trimethyl amine (33% solution in water) are reacted under a reflux for about fifty minutes. The reaction product is then dehydrated preferably under diminished pressure as for example 26 inches vacuum until 67 parts of water are removed, and the resulting resinous product dissolved in 70.5 parts alcohol to give a varnish of about 60% solids content.

Such a varnish is practically stable at normal room temperatures as is shown in the following table giving the change in viscosity over a period of days. For the sake of comparison a similar varnish prepared from the same ingredients but using ammonia as a catalyst is given also.

| Time—days | Viscosity tri-methyl-amine catalyzed varnish | Viscosity diethylamine catalyzed varnish | Viscosity ammonia catalyzed varnish |
|---|---|---|---|
| | k. v. | k. v. | k. v. |
| When prepared | 330 | 365 | 520 |
| 18 | 335 | 365 | 610 |
| 50 | 375 | 370 | 715 |
| 95 | 385 | 395 | 1090 |
| 137 | 405 | 435 | 2035 |
| 192 | 440 | 505 | Over 5000 |

*Aging tests at 90° F. (32.2° C.)*

| Time—days | Viscosity $NH_3$ catalyzed varnish | Viscosity $(CH_3)_3N$ catalyzed varnish | Viscosity $(CH_3)_3NH$ catalyzed varnish | Viscosity $NH_3$ catalyzed varnish |
|---|---|---|---|---|
| | k. v. | k. v. | k. v. | k. v. |
| When prepared | 470 | 335 | 260 | 230 |
| 30 | 670 | 340 | 250 | 370 |
| 60 | 1130 | 390 | 295 | 560 |
| 90 | Over 1600 | 445 | 340 | 950 |

Other examples of amine catalyzed varnishes are as follows (parts by weight):

Example II

| | Parts |
|---|---|
| Commercial cresol | 100 |
| 37% formaldehyde solution | 100 |
| 33% solution dimethyl amine | 1.0 |

The above mixture is refluxed 60 minutes, then dehydrated under 26 inches vacuum to 115–120° C. and dissolved in 70.5 parts alcohol.

Example III

| | Parts |
|---|---|
| Commercial cresol | 100 |
| 37% formaldehyde solution | 80 |
| 33% solution diethyl amine | 3.5 |

The above mixture is refluxed 70 minutes, then dehydrated as above to 115–120° C. and dissolved in 70.5 parts alcohol.

Example IV

| | Parts |
|---|---|
| Commercial cresol | 100 |
| 37% formaldehyde solution | 80 |
| 100% triethyl amine | 1.0 |

The above is refluxed 60 minutes, then dehydrated as above and dissolved in 70.5 parts solvent.

Example V

| | Parts |
|---|---|
| Commercial cresol | 100 |
| 37% formaldehyde solution | 80 |
| 100% triamyl amine | 2.5 |

The above is refluxed 70 minutes, then dehydrated under 26 inches vacuum and dissolved in 70.5 parts alcohol.

Example VI

| | Parts |
|---|---|
| Commercial xylenol | 100 |
| 37% formaldehyde solution | 80 |
| 33% solution trimethyl amine | 0.3 |

The above is refluxed 60 minutes, then dehydrated under the above vacuum and dissolved in the above solvent.

Example VII

| | Parts |
|---|---|
| Commercial xylenol | 100 |
| 37% formaldehyde solution | 80 |
| 100% diethyl amine | 0.2 |

The above is refluxed 50 minutes, dehydrated under the above vacuum and dissolved in the above solvent.

As compared with ammonia catalyzed cresol-formaldehyde varnishes, laminated material made from cresol varnishes using the above amine catalysts is especially characterized by high water and alkali resistance, good electrical properties, especially insulation resistance after exposure to a humid atmosphere. The mechanical strength is quite satisfactory, the surface of such laminated material being particularly hard and resistant to abrasion. It is particularly economical to produce. The decreased time of molding required using these amine catalyzed varnishes permits 30–50% greater output of laminated materials in the same time cycle required for molding laminated prepared with ordinary cresol resinoid varnishes. For laminated materials, test samples of which were made as previously described with surface sheets containing 57 to 60% resin, the percentage increase in weight when immersed in 5% caustic soda solution for 48 hours at room temperature, the scratch hardness as determined by the weight in grams necessary to be placed above a point and drawn over the surface to produce a surface scratch, and the insulation resistance (A. S. T. M. designation D257—33 par. 6—b) after exposing samples for 96 hours at 90% relative humidity and 95° F., are as follows:

| Catalyst used | Caustic test percent increase in weight | Scratch hardness, grams | Insulation resistance (humid) megohms |
|---|---|---|---|
| Trimethylamine | 3.7 | 800 | 1625 |
| Dimethylamine | 5.1 | 590 | 2950 |
| Diethylamine | 5.2 | 750 | 2425 |
| Ammonia | 14.2 | 435 | 74 |

From the above it will be seen that both the varnishes prepared with the herein described catalysts as well as the products in which these varnishes are incorporated, offer numerous advantages. The processes by which the varnishes are made and used are also much simplified. The varnishes are exceedingly stable in storage and have relative uniform viscosity even after aging; and as a result, a laminator can produce his products without constant and undue changes and modifications in his procedure caused by using an unstable varnish. A further result of the use of these varnishes is that the laminated material or other product in which the varnish is used, is quite uniform. Moreover, according to this invention low cost raw materials, for instance cresols or xylenols or higher molecular weight phenolic bodies may be used as a basis for the varnish, instead of the more expensive phenol, and yet the resin film deposited from the varnish hardens as quickly as the usual phenol varnish film and it hardens much more quickly than the usual cresol or xylenol varnish film. Particularly with regard to laminated material as well as other materials utilizing coating and impregnating substances, excellent penetration and impregnation may be obtained even from varnishes which have been stored for from 3 to 6 months and a satisfactory hard surface may be obtained under heat and pressure from fillers impregnated with the stored varnish. The penetration and impregnation characteristics of the varnish are substantially unaffected over prolonged periods of time since the solubility of the resin is not substantially decreased with prolonged storage, as is the case with the usual types of varnish. As has previously been described a smaller percentage of these polyalkyl amine catalysts is required than is the case with the cyclic or hydroxy amine types of catalysts. Varnishes made with the herein described catalysts impart better water and caustic resistance to heat hardening materials in which they are incorporated. The electrical properties of such materials are also improved as previously described, and it is possible to prepare stable yet quick hardening varnishes which contain no salts. As previously described there is no necessity of neutralizing catalysts or washing salts from the resin or varnish and those desirable intermediate reaction products which impart good flowing qualities to the resin are retained in the composition.

It will be evident from the previous description that there are numerous ways of preparing and using the materials of this invention and that numerous different varnishes may be prepared. It is therefore desired that the invention be construed as broadly as the following claims taken in conjunction with the prior art, may allow.

I claim:

1. Varnish composition comprising a solvent and a synthetic resin dissolved therein, said resin being the product resulting from reacting a methylene body with a phenolic body having a molecular weight higher than phenol in the presence of a catalyst of the formula (alkyl)₂N—R where R is selected from the group consisting of hydrogen and alkyl radicals, stopping the reaction while water soluble reaction products are present in the reaction mass, dehydrating to remove water but substantially none of the water soluble reaction products, said resin in the varnish containing substantially all of the reaction products of the methylene body and the phenolic body including those which are water soluble.

2. Varnish composition comprising a solvent and a synthetic resin dissolved therein, said resin being the product resulting from reacting a methylene body with a homolog of phenol in the presence of a catalyst of the formula (alkyl)₂N—R where R is selected from the group consisting of hydrogen and alkyl radicals, stopping the reaction while water soluble reaction products are present in the reaction mass, dehydrating to remove reaction water but substantially none of the water soluble reaction products, said resin containing the water soluble reaction products of the methylene body and the phenolic body.

3. Varnish composition comprising a solvent and a synthetic resin dissolved therein, said resin being the product resulting from reacting a methylene body with a homolog of phenol in the presence of a catalyst more basic than ammonia and of the formula (alkyl)₂N—R where R is selected from the group consisting of hydrogen and alkyl radicals, stopping the reaction while water soluble reaction products are present in the reaction mass, dehydrating to remove water but substantially none of the water soluble reaction products, said varnish containing substantially all of the products containing combinations of the methylene body and the phenolic body including those which are water soluble.

4. Varnish composition comprising a solvent and a synthetic resin dissolved therein, said resin being the product resulting from reacting a methylene body with a homolog of phenol in the presence of a catalyst vaporizable with water in the presence of the reaction mixture and of the formula (alkyl)₂N—R where R is selected from the group consisting of hydrogen and alkyl radicals, stopping the reaction while water soluble reaction products are present in the reaction mass, dehydrating to remove water but substantially none of the water soluble reaction products, said resin containing substantially all of the reaction products of the methylene body and the phenolic body including those which are water soluble.

5. Varnish composition comprising a solvent and a synthetic resin dissolved therein, said resin being the product resulting from reacting a methylene body with a homolog of phenol in the presence of a catalyst of the formula (alkyl)₂N—R where R is selected from the group consisting of hydrogen and alkyl radicals, stopping the reaction while water soluble reaction products are present in the reaction mass, dehydrating to remove water but substantially none of the water soluble reaction products, the varnish containing the water soluble resinous reaction products of the reactants and less than 0.2% of nitrogen based on the weight of the resin.

6. Varnish composition comprising a solvent and a synthetic resin dissolved therein, said resin being a product resulting from reacting a methylene body with a homolog of phenol in the presence of a catalyst of the formula (alkyl)₂N—R where R is selected from the group consisting of hydrogen and alkyl radicals, stopping the reaction while water soluble reaction products are present in the reaction mass, dehydrating to remove water but substantially none of the water soluble reaction products, the varnish containing the water soluble resinous products of the reaction and between .03 and 12% of nitrogen based on the weight of the resin.

7. Varnish composition comprising a solvent and a synthetic resin dissolved therein, said resin being the product resulting from reacting a methylene body with a homolog of phenol in the presence of a catalyst of the formula (alkyl)₂N—R where R is selected from the group consisting of hydrogen and alkyl radicals, stopping the reaction while water soluble reaction products are present in the reaction mass, dehydrating to remove water but substantially none of the water soluble reaction products, the varnish being substantially free from salts and containing substantially all of the water soluble reaction products of the methylene body and the phenolic body.

8. Varnish composition comprising a solvent and a synthetic resin dissolved therein, said resin being the product resulting from reacting a methylene body with a homolog of phenol in the presence of a catalyst, of the formula (alkyl)₂N—R where R is selected from the group consisting of hydrogen and alkyl radicals, stopping the reaction while water soluble reaction products are present in the reaction mass, dehydrating to remove water but substantially none of the water soluble reaction products, the varnish when containing substantially 60% resin and 40% solvent having a viscosity change of less than 7% in 30 days at 25° C.

9. Varnish composition comprising a solvent and a heat reactive synthetic resin dissolved therein, said resin being the product resulting from reacting a methylene body with a homolog of phenol in the presence of a compound of the formula (alkyl)$_2$N—R where R is selected from the group consisting of hydrogen and alkyl radicals, stopping the reaction while water soluble reaction products are present in the reaction mass, dehydrating to remove water but substantially none of the water soluble reaction products, and containing substantially all of the reaction products of the methylene body and the phenolic body including those which are water soluble.

10. Process of preparing a varnish comprising reacting a phenolic body of higher molecular weight than phenol with a methylene body in the presence of a catalyst of the formula (alkyl)$_2$N—R where R is selected from the group consisting of hydrogen and alkyl radicals, stopping the reaction while water soluble reaction products are present in the reaction mass, removing water by a process which leaves in the reacted mass substantially all of the reaction products including those which are water soluble and dissolving the reaction product in a solvent.

11. Process of preparing a varnish comprising reacting a homolog of phenol with a methylene body in the presence of a catalyst of the formula (alkyl)$_2$N—R where R is selected from the group consisting of hydrogen and alkyl radicals, stopping the reaction while water soluble reaction products are present in the reaction mass, distilling of water while leaving in the reacted mass substantially all of the products containing combinations of the phenolic body and the methylene body, and dissolving the reaction product in a solvent.

12. Process of preparing a varnish comprising reacting a homolog of phenol with a methylene body in the presence of catalyst of the formula (alkyl)$_2$N—R where R is selected from the group consisting of hydrogen and alkyl radicals, until at least 90% of methylene theoretically condensible with the phenolic body has reacted, stopping the reaction while water soluble reaction products are present in the reaction mass, distilling off water and dissolving the reaction product in a solvent.

13. Process of preparing a varnish comprising reacting a homolog of phenol with a methylene body in the presence of a catalyst of the formula (alkyl)$_2$N—R where R is selected from the group consisting of hydrogen and alkyl radicals, stopping the reaction while water soluble reaction products are present in the reaction mass, distilling off at least 95% of the water and dissolving the reaction product in a solvent.

14. Process of preparing a varnish comprising reacting a homolog of phenol with a methylene body in the presence of a catalyst of the formula (alkyl)$_2$N—R where R is selected from the group consisting of hydrogen and alkyl radicals, said catalyst being vaporizable with water in the presence of the reaction mixture, stopping the reaction while water soluble reaction products are present in the reaction mass, distilling off water and a portion of the catalyst, and dissolving the reaction product in a solvent.

15. Coated or impregnated material including the dried residue of a varnish composition, said varnish composition comprising a solvent and a synthetic resin dissolved therein, said resin being the product resulting from reacting a methylene body with a homolog of phenol in the presence of a catalyst of the formula (alkyl)$_2$N—R where R is selected from the group consisting of hydrogen and alkyl radicals, stopping the reaction while water soluble reaction products are present in the reaction mass, dehydrating to remove water but substantially none of the water soluble reaction products, said resin containing substantially all of the reaction products of the methylene body and the phenolic body including those which are water soluble.

HARRY KLINE.

---

CERTIFICATE OF CORRECTION.

Patent No. 2,151,975.             March 28, 1939.

HARRY KLINE.

It is hereby certified that error appears in the printed specification of the above numbered patent requiring correction as follows: Page 5, first column, line 64, claim 3, for "conststing" read consisting; and second column, line 42, claim 6, for "12%" read .12%; and that the said Letters Patent should be read with this correction therein that the same may conform to the record of the case in the Patent Office.

Signed and sealed this 30th day of May, A.D. 1939.

Henry Van Arsdale (Seal)                            Acting Commissioner of Patents.